(12) United States Patent
McCarthy

(10) Patent No.: US 11,965,669 B2
(45) Date of Patent: Apr. 23, 2024

(54) FLEXIBLE DUCT WITH INTERCHANGEABLE END, CONNECTOR FOR FLEXIBLE DUCT, AND METHOD THEREOF

(71) Applicant: NTI GLOBAL, Amsterdam, NY (US)

(72) Inventor: Rachal McCarthy, Amsterdam, NY (US)

(73) Assignee: NTI GLOBAL, Amsterdam, NY (US)

( * ) Notice: Subject to any disclaimer, the term of this patent is extended or adjusted under 35 U.S.C. 154(b) by 82 days.

(21) Appl. No.: 17/472,928

(22) Filed: Sep. 13, 2021

(65) Prior Publication Data
US 2021/0404698 A1  Dec. 30, 2021

Related U.S. Application Data

(63) Continuation of application No. 15/922,225, filed on Mar. 15, 2018, now Pat. No. 11,131,477.

(51) Int. Cl.
*F24F 13/02* (2006.01)
*F16L 11/112* (2006.01)
(Continued)

(52) U.S. Cl.
CPC ......... *F24F 13/0209* (2013.01); *F16L 11/112* (2013.01); *F16L 25/0045* (2013.01);
(Continued)

(58) Field of Classification Search
CPC ............... F24F 13/0209; F24F 13/0218; F16L 25/0045; F16L 33/2071; F16L 33/003; F16L 11/112
(Continued)

(56) References Cited

U.S. PATENT DOCUMENTS 2,263,478 A   11/1941   Weeks
2,704,675 A   3/1955   Henderson
(Continued)

FOREIGN PATENT DOCUMENTS

CN   1125828 A   7/1996
CN   1420975 A   5/2003
(Continued)

OTHER PUBLICATIONS

Restriction Requirement (dated Jul. 14, 2020) for U.S. Appl. No. 15/922,225, filed Mar. 15, 2018.
(Continued)

*Primary Examiner* — Zachary T Dragicevich
(74) *Attorney, Agent, or Firm* — Schmeiser, Olsen & Watts, LLP

(57) ABSTRACT

A flexible duct includes a hollow tube shape, at least one end, a first circumferential attachment and a second circumferential attachment integral to the at least one end, wherein the first circumferential attachment and the second circumferential attachment are each configured to independently mechanically couple the at least one end around a first inlet or a first outlet, and wherein the first circumferential attachment and the second circumferential attachment are different. A method includes providing a flexible duct, selecting one of the first circumferential attachment or second circumferential attachment of the flexible duct, and mechanically coupling the selected first circumferential attachment or second circumferential attachment around the first inlet or first outlet. A connector for a flexible duct includes a hollow tube shape extending between a first connector end and a second connector end and a first circumferential attachment and second circumferential attachment integral to the at least one end.

16 Claims, 14 Drawing Sheets

(51) Int. Cl.
*F16L 25/00* (2006.01)
*F16L 33/00* (2006.01)
*F16L 33/207* (2006.01)
*F24F 7/04* (2006.01)

(52) U.S. Cl.
CPC ......... *F16L 33/003* (2013.01); *F16L 33/2071* (2013.01); *F24F 7/04* (2013.01); *F24F 13/0218* (2013.01)

(58) Field of Classification Search
USPC .......................................... 285/236, 242, 12
See application file for complete search history.

(56) References Cited

U.S. PATENT DOCUMENTS

| | | |
|---|---|---|
| 2,711,331 A | 6/1955 | Temple |
| 2,750,210 A | 6/1956 | Trogdon et al. |
| 2,810,593 A | 10/1957 | Petoskey |
| 2,841,419 A | 7/1958 | Jay |
| 2,907,592 A | 10/1959 | Bailey |
| 3,216,459 A | 11/1965 | Schroeder et al. |
| 3,325,193 A | 6/1967 | Castello |
| 3,428,341 A | 2/1969 | Mueller |
| 3,596,936 A | 8/1971 | Dieckmann et al. |
| 3,705,736 A | 12/1972 | Dawson |
| 3,874,712 A | 4/1975 | Watson |
| 3,915,477 A | 10/1975 | Timmons |
| 4,010,518 A | 3/1977 | Rejeski et al. |
| 4,023,834 A | 5/1977 | Ewing et al. |
| 4,099,747 A | 7/1978 | Meserole |
| 4,312,525 A | 1/1982 | Kleykamp |
| 4,403,796 A | 9/1983 | Ledbetter et al. |
| 4,559,249 A | 12/1985 | Arigaya et al. |
| 4,601,476 A | 7/1986 | Usher et al. |
| 5,028,077 A | 7/1991 | Hurst |
| 5,145,215 A | 9/1992 | Udell |
| 5,462,291 A | 10/1995 | Maeda et al. |
| 5,661,876 A | 9/1997 | Goldenberg |
| 7,393,021 B1 | 7/2008 | Lukjan |
| 8,637,768 B2 | 1/2014 | Sawyer |
| 2001/0026048 A1 | 10/2001 | Proctor et al. |
| 2009/0321105 A1 | 12/2009 | Sawyer |
| 2010/0201116 A1 | 8/2010 | Kipker et al. |
| 2011/0108150 A1 | 5/2011 | Renaud |
| 2011/0139290 A1 | 6/2011 | Duell |
| 2016/0186906 A1 | 6/2016 | Blake et al. |
| 2016/0369922 A1 | 12/2016 | Blake et al. |
| 2017/0038090 A1 | 2/2017 | Bianchi et al. |
| 2018/0142821 A1 | 5/2018 | Kelleher |

FOREIGN PATENT DOCUMENTS

| | | |
|---|---|---|
| CN | 1692060 A | 11/2005 |
| CN | 102635745 A | 8/2012 |
| CN | 104159532 A | 11/2014 |
| CN | 112539306 A | 3/2021 |
| EP | 0280598 A1 | 8/1988 |

OTHER PUBLICATIONS

Office Action (dated Aug. 26, 2020) for U.S. Appl. No. 15/922,225, filed Mar. 15, 2018.

Final Office Action (dated Jan. 13, 2021) for U.S. Appl. No. 15/922,225, filed Mar. 15, 2018.

Notice of Allowance (dated May 25, 2021) for U.S. Appl. No. 15/922,225, filed Mar. 15, 2018.

Chinese Office Action for Application No. 201910197872.4, dated Jan. 25, 2022.

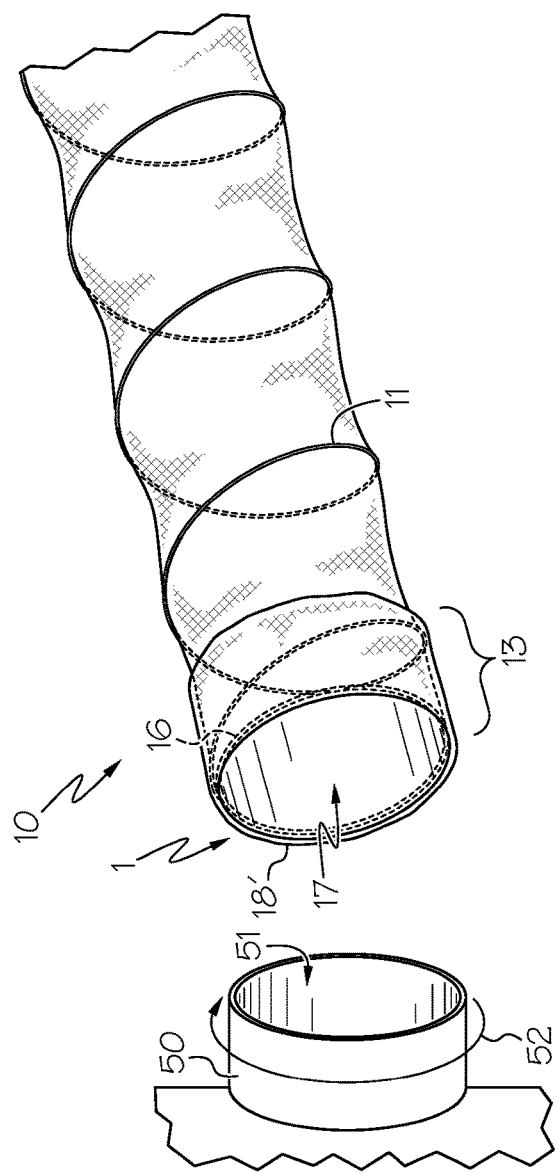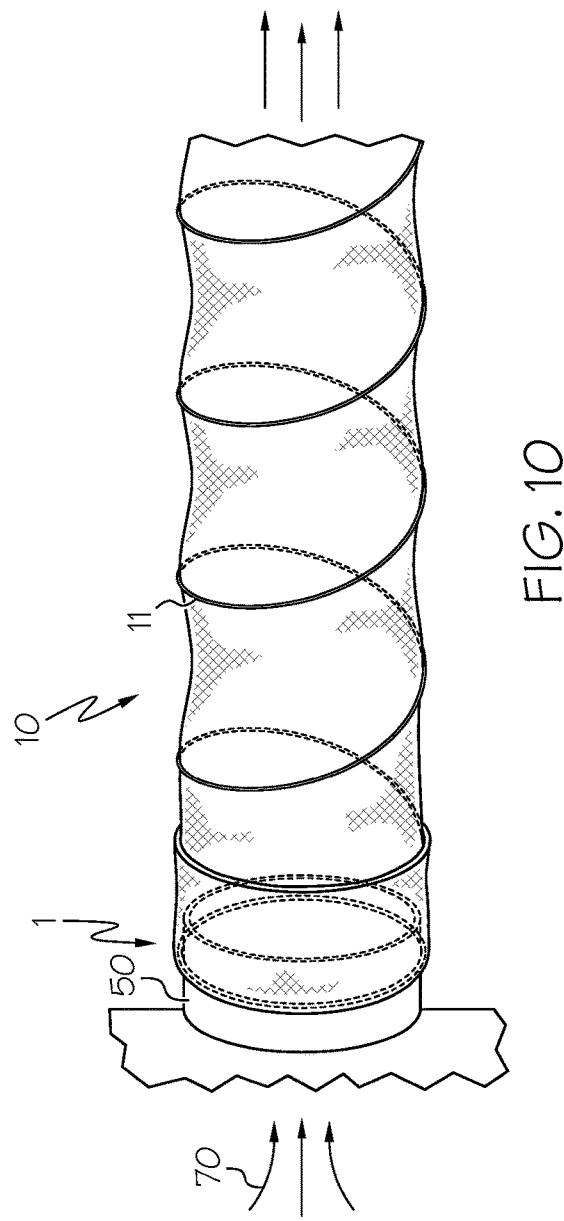

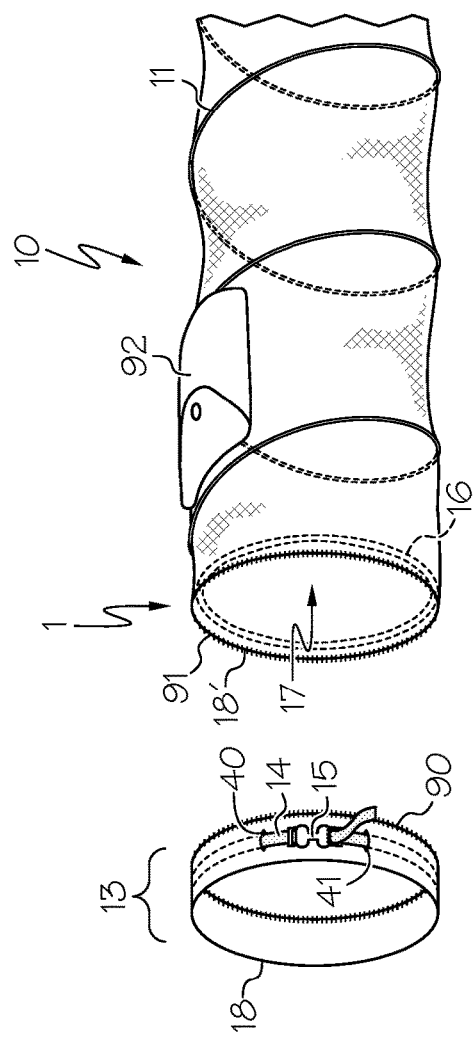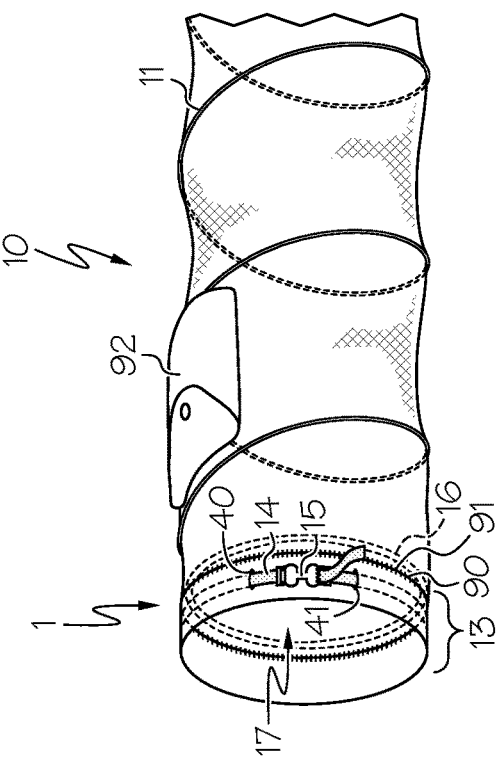

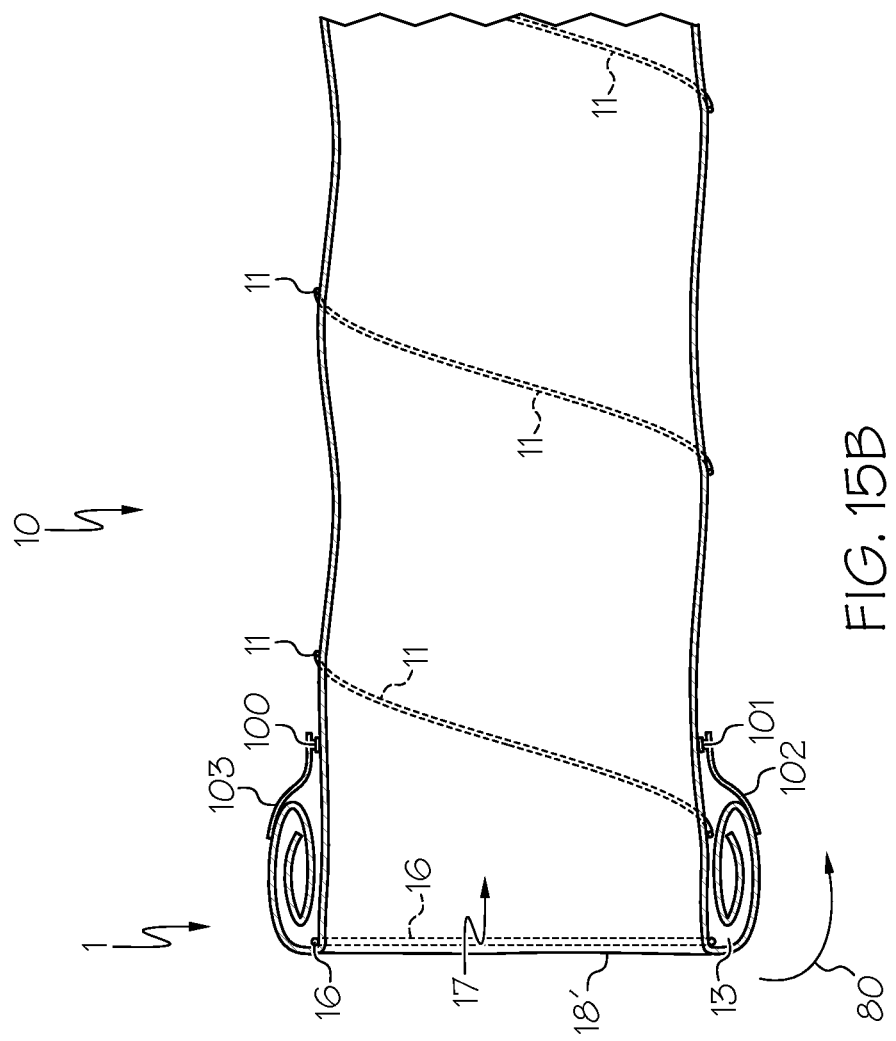
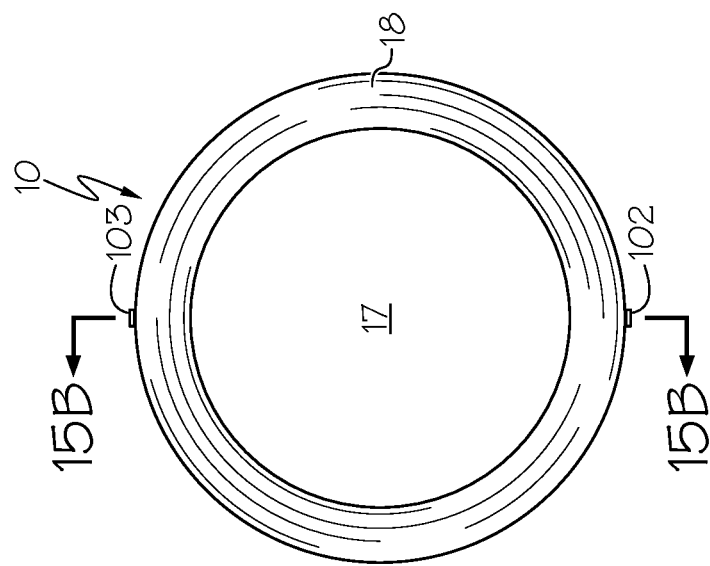
FIG. 15B
FIG. 15A

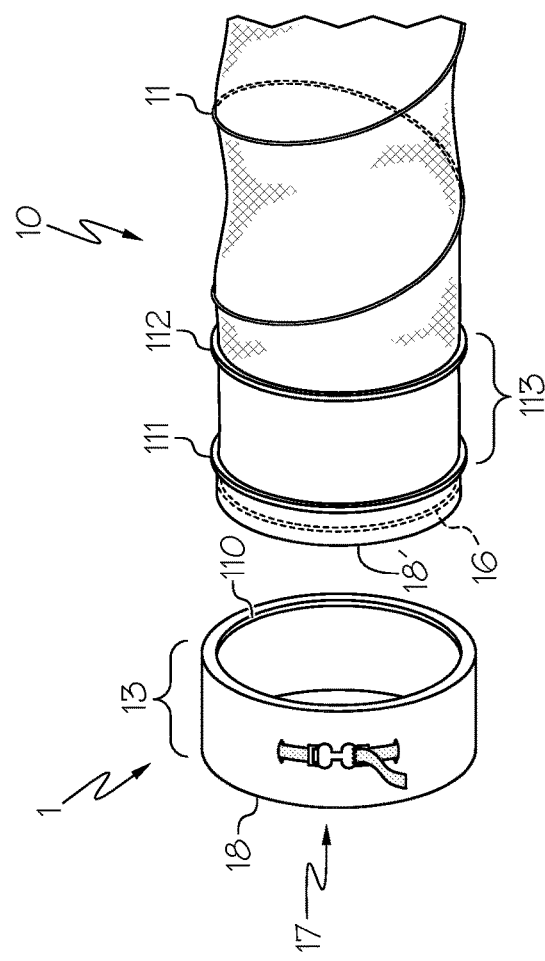
FIG.16
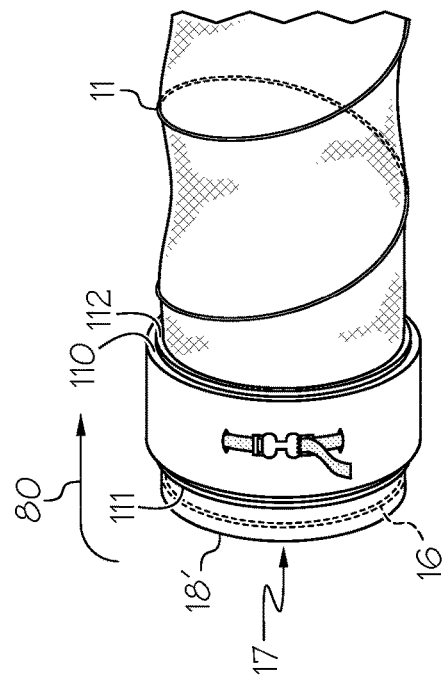
FIG.18
FIG.17

FLEXIBLE DUCT WITH INTERCHANGEABLE END, CONNECTOR FOR FLEXIBLE DUCT, AND METHOD THEREOF

CROSS-REFERENCE TO RELATED APPLICATIONS

This application is a continuation application that claims priority to and the benefit of U.S. application Ser. No. 15/922,225, filed Mar. 15, 2018, and entitled "Connector for Flexible Duct, Flexible Duct with Interchangeable End, and Method Thereof," now U.S. Pat. No. 11,131,477, the entire contents of which are hereby incorporate by reference.

FIELD OF TECHNOLOGY

The subject matter disclosed herein relates generally to flexible ventilation ducts. More particularly, the present disclosure concerns connectors for flexible ventilation ducts and ventilation duct ends having interchangeable attachments.

BACKGROUND

Ducts can be used to transport air and other fluids from one location to another. Ducts can be attached to other ducts to traverse the distance between an air and/or fluid source and an air and/or fluid destination. Ducts can also be attached directly to air sources and air destinations by the attachments at the ends of a duct. Ducts can also be used as agility tunnels for dogs or other domesticated animals. Attachment refers to the configuration of an end of a duct by which a duct connects with a first inlet or outlet. In some instances, connecting a duct requires that each end of the duct has a different attachment. This may be because a first inlet—for example, a location to which a duct is needed to transport or direct air and/or fluid—has a different opening configuration than a first outlet—for example, a location from which a duct is needed to transport or direct air and/or fluid. To accommodate these differences, multiple ducts with different ends must often be acquired so that many different configurations are available. This often requires expensive custom manufacturing of ducts having two ends each with a different attachment. Custom manufacturing can be cost-prohibitive for manufacturers if only one or two customers have a need for different configurations, because manufacturers may need to use more resources to create a duct with different attachments. Expenses for manufacturers can also increase with inventory of this type of duct because many different customers may have different duct attachment configuration needs.

For the user or customer, having to purchase multiple ducts due to a need for different attachments can also be expensive, and likewise may require additional storage for the ducts when they are not in use. For businesses offering ducting services, the expenses of acquiring custom ducts with different attachments may preclude gaining certain customers if the businesses are unable to perform a job without a custom duct.

Accordingly, a need exists for a duct end to have different attachments on the same end of the duct that can be attached to air sources and air destinations, or inlets and outlets, in different ways. A user can thereby select an attachment from the different attachments where the different attachments are interchangeable. Such a duct end would permit users and/or customers to invest in a single duct that can be applied to several uses depending on the attachments needed, which would save considerable capital and operating expenses. Manufacturers could accordingly develop a single cost-effective manufacturing process for making this type of duct end, and then sell the ducts to multiple customers. The expense and hassle of needing different or additional storage of specific ducts for specific customers would be alleviated as well.

An additional benefit is that when large ducts are required to be transported to a project site, if the project site is determined to have different inlets or outlets than expected, the large ducts do not need to be transported away and new ducts acquired, because the large ducts with one or more ends each having two different interchangeable attachments could provide multiple different attachment configurations to meet the unexpected requirements. Similarly, if a user is required to provide ducts to multiple different types of outlets at different times, instead of having to remove and replace entire ducts to use different ends, the user could select which attachment is appropriate of multiple different attachments on a single end, and connect a single duct end to the required location with that selected attachment, all without having to relocate or reorient the duct.

Likewise, a connector having different attachments that can be affixed to an end of a duct would be advantageous because ducts that already exist could be fitted with the connector. A connector that can affix to the end of a duct that already exists would allow the pre-existing duct to attach to a first inlet or a first outlet with different attachments.

SUMMARY

According to a first aspect, a flexible duct comprises a hollow tube shape, at least one end, a first circumferential attachment integral to the at least one end, a second circumferential attachment integral to the at least one end, wherein the first circumferential attachment and the second circumferential attachment are each configured to independently mechanically couple the at least one end around a first inlet or a first outlet, and wherein the first circumferential attachment and the second circumferential attachment are different.

According to another aspect, a method of using a flexible duct comprises providing a flexible duct including a hollow tube shape, at least one end, a first circumferential attachment integral to the at least one end, a second circumferential attachment integral to the at least one end, wherein the first circumferential attachment and the second circumferential attachment are each configured to independently mechanically couple the at least one end around a first inlet or a first outlet, and wherein the first circumferential attachment and the second circumferential attachment are different, selecting one of the first circumferential attachment or the second circumferential attachment, and mechanically coupling the selected first circumferential attachment or second circumferential attachment around the first inlet or first outlet.

According to another aspect, a connector for a flexible duct comprises a hollow tube shape extending between a first connector end and a second connector end, a first circumferential attachment integral to the first connector end, a second circumferential attachment integral to the first connector end, wherein the second connector end is configured to be affixed to a flexible duct end of the flexible duct such that an opening extends through the connector and flexible duct, wherein the first circumferential attachment and the second circumferential attachment are each configured to independently mechanically couple the flexible duct around the first end to a first inlet or a first outlet, and wherein the first circumferential attachment and the second circumferential attachment are different.

These embodiments have a number of benefits, including permitting users and or customers to invest in a single duct that can be applied to several uses depending on the attachments needed, which would save considerable capital and operating expenses compared to having to purchase multiple ducts with custom attachments at the ends. Manufacturers are similarly able to develop a single cost-effective manufacturing process for making this type of duct end, and then sell the ducts to multiple customers. The expense and hassle of needing different or additional storage of specific ducts for specific customers would be alleviated as well. In addition, when large flexible ducts are required to be transported to a project site, if the project site is determined to have different inlets or outlets than expected, the duct does not need to be transported away and new duct acquired, because the duct with an end having two different interchangeable attachments could provide multiple different attachment configurations to meet the unexpected requirements.

A connector allows manufacturers to more easily customize ducts that manufacturers already produce. In addition, where a user is required to provide ducting to multiple different types of outlets at different times, instead of having to remove and replace ducts with different ends, the user could select which attachment is appropriate, and connect a single duct end to the required location with that selected attachment, all without having to relocate or reorient the duct. A connector enables users to retrofit their existing ducts to be more versatile without having to invest in entirely new ducts. Instead of purchasing new ducts, users can simply obtain a connector having different attachments, and affix the connector to an end of a preexisting duct to allow the pre-existing duct to attach to a first inlet or a first outlet with different attachments.

BRIEF DESCRIPTION OF THE DRAWINGS

Some of the embodiments will be described in detail, with reference to the following figures, wherein like designations denote like members, wherein:

FIG. 9 depicts a perspective view of an end of the flexible portable ventilation duct with the hoop attachment positioned for usage and an air outlet of a heater;

FIG. 10 depicts a perspective view of an end of a flexible portable ventilation duct attached to the air outlet by the hoop attachment;

FIG. 12 depicts a perspective view of an embodiment of the flexible portable ventilation duct in which the cuff is releasably attachable to the flexible portable ventilation duct by a zipper and is released from the flexible portable ventilation duct;

FIG. 13 depicts a perspective view of an embodiment of the flexible portable ventilation duct in which the cuff is releasably attachable to the flexible portable ventilation duct by a zipper and is attached to the flexible portable ventilation duct;

FIG. 15A depicts a front view of an end of the flexible portable ventilation duct;

FIG. 15B depicts a cut-away side view taken along line B-B of the flexible portable ventilation duct in which the cuff is rolled backwards and secured with the two snap button tabs;

FIG. 16 depicts a perspective view of an embodiment of the flexible portable ventilation duct in which the cuff has a circumferential projection;

FIG. 17 depicts a perspective view of the flexible portable ventilation duct shown in FIG. 16, in which the cuff is positioned on the flexible portable ventilation duct;

FIG. 18 depicts a schematic close-up view of the circumferential projection of the cuff shown in FIG. 16;

DETAILED DESCRIPTION

Figure 1:
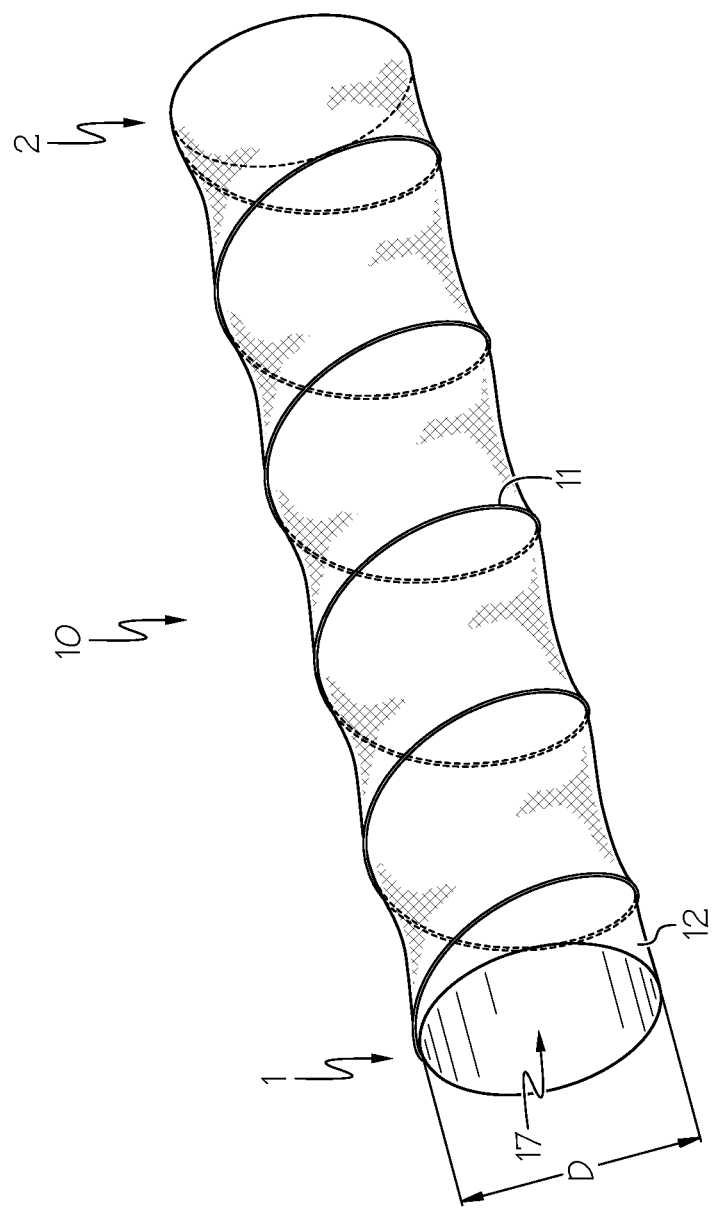
FIG. 1 depicts a perspective view of a flexible portable ventilation duct.

Embodiments of the present invention can be modified in various forms, and the scope of embodiments of the present invention should not be construed as being limited to embodiments described below. The embodiments are provided to fully describe embodiments of the present invention to those of ordinary skill in the art. Therefore, in the drawings, shapes of components and the like are exaggerated for clarity of description.

Referring to FIG. 1, a perspective view of a flexible portable ventilation duct 10 is shown. Flexible portable ventilation duct 10 has a hollow cylindrical tube shape and two ends 1, 2. A circular opening 17 extends throughout the entire length of the flexible portable ventilation duct 10 such that the opening 17 extends continuously between end 1 and end 2. The opening 17 forms a duct inlet and a duct outlet, a duct inlet located where air enters the flexible portable ventilation duct 10, and a duct outlet located where air exits the flexible portable ventilation duct 10. Each of ends 1, 2 may be a duct inlet or a duct outlet based on the use of the flexible portable ventilation duct 10. The flexible portable ventilation duct 10 may move any air for example, dust, methane, toxic air or fluids from mines, radioactive contaminants, aircraft emissions, automobile emissions and the like.

Flexible portable ventilation duct 10 is made of a duct material 12. The flexible portable ventilation duct 10 may also be referred to as a conduit, tube, passage, flexible pipe, vent, hose, channel or the like. The duct material 12 can be PVC, for example, vinyl, or vinyl with reinforcing scrim, PVC manufactured with extrusion-coated polyester scrim. The duct material 12 may also be PE film, woven PE, silicone coated fabric, coated or uncoated polyester, neoprene, flame retardant vinyl fabric; fiberglass coated with dry silicone rubber; carbon poly based fabric; any other flexible materials used to contain air and move or direct air in a specific direction, and the like. The duct material 12 may be made of textiles or fabrics having different weights. The duct material 12 may have additional properties for specific applications such as impermeable material to seal air, radioactive material, high heat or cooled air and the like. For example, the duct material 12 may have anti-static properties for applications or uses involving gaseous or flammable environments. As another example, the duct material 12 may have anti-mildew, anti-bacterial, flame-retardant or anti-rot additives. As a further example, the duct material 12 may be waterproof, tear-resistant, or have anti-abrasion properties. The duct material 12 may have any combination of these and other additives and properties.

A helical wire 11 spirals around the length of the flexible portable ventilation duct 10. The helical wire 11 may be thermally sealed to the duct material 12, and may also be attached to the duct material 12 by stitching, fastening, and the like. The helical wire 11 may be braided and galvanized wire. The helical wire 11 may be steel wire, springsteel wire, plastic, wire that is not braided, and the like. The helical wire 11 is not limited to being helical. For example, the helical wire 11 may be a plurality of continuous wire rings placed equidistant from each other along the length of the flexible portable ventilation duct 10. As another example, the flexible portable ventilation duct 10 may have no helical wire 11 or other wire around its length.

The helical wire 11 of the flexible portable ventilation duct 10 can have different pitches. "Pitch" defines the space between each spiral of the helical wire 11 around the circumference of the flexible portable ventilation duct 10. For example, the pitch of the flexible portable ventilation duct 10 may be 1.5 inches, 3 inches, or 6 inches. The pitch of the flexible portable ventilation duct 10 can vary based on whether the application for which the flexible portable ventilation duct 10 is being used requires high negative pressure, standard pressure, low negative pressure, or low positive pressure, and the like.

The circular opening 17 of flexible portable ventilation duct 10 has a diameter D. The diameter D of flexible portable ventilation duct 10 may vary depending on the use or application of the flexible portable ventilation duct 10. For example, the opening 17 may have a diameter D of 6 inches or 60 inches. Flexible portable ventilation duct 10 may extend for various lengths, for example, 10 feet, 25 feet, or 50 feet, or other lengths. The opening 17 is not limited to being circular in shape, and could be a rectangle, square, triangle, or other shape. Likewise, the flexible portable ventilation duct 10 is not limited to being cylindrical in shape, and could have a cross section that is rectangular, square, triangular, or any shape corresponding to the opening to which the flexible portable ventilation duct 10 is attachable. The opening 17 is not limited to being the same shape as the cross-section of the flexible portable ventilation duct 10. For example, the flexible portable ventilation duct 10 may be cylindrical in shape, and the opening 17 may be rectangular in shape.

Flexible portable ventilation duct 10 may be configured for use in applications such as portable heating and cooling, shaft ventilation, residential or commercial ventilation, desiccant or dehumidification, air purification, industrial environmental control, and any other ventilation, heating or cooling applications such as applications requiring heat levels to be maintained at temperatures of, for example, 550 degrees Fahrenheit or applications requiring cooling of buildings, rooms, enclosed areas, or other locations, for example, keeping a location at a temperature lower than that of the ambient air outside; aviation applications, like heating or cooling aircraft; mining applications; military applications; industrial applications, for example, use in manholes; dust-collection applications; and oil sands and drilling applications.

Figure 2:
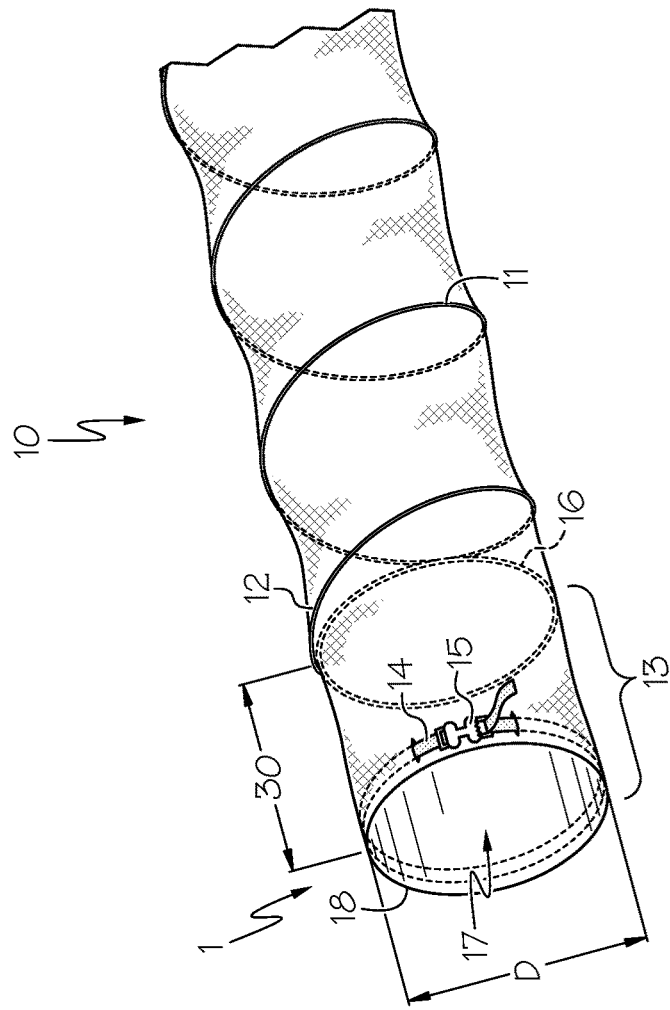
FIG. 2 depicts a perspective view of an end of a flexible portable ventilation duct having interchangeable attachments.

Referring to FIG. 2, end 1 of the flexible portable ventilation duct 10 is shown in detail. In a first embodiment, a circular hoop 16 forms a first attachment and is affixed to the flexible portable ventilation duct 10 around the flexible portable ventilation duct 10 a distance 30 away from edge 18 of opening 17 at end 1. The edge 18 can also be referred to as the boundary, end, mouth, portal, ring or termination. The hoop 16 is positioned parallel to the opening 17 around the flexible portable ventilation duct 10. The hoop 16 may be secured within the duct material 12 by stitching, glue, staples, adhesive, clips, magnets, and the like. The hoop 16 may also be secured by being welded. The hoop 16 may be made of thick wire, braided galvanized wire, or wire rope. The hoop 16 may also be made of wood, steel, plastic, or any other material having a rigidity that retains the shape of the hoop 16. The hoop 16 may have a diameter equal to the diameter D of the opening 17. The hoop 16 is not limited to being circular in shape, and could be rectangular, triangular, and the like, or a shape that is configured to match the shape of an outlet or opening to which the flexible portable ventilation duct 10 attaches. The duct material 12 extending the distance 30 from the hoop 16 to the end 18 of the flexible portable duct material forms a cuff 13. The cuff 13 is defined by an opening, aperture, inlet or outlet in the flexible portable ventilation duct 10. Within the duct material 12 of the cuff 13 is a strap 14. The strap 14 extends around the cuff 13 and is adjustably securable with a buckle 15. The strap could be a rope, a string, a cord, elastic, a length of fabric, or the like. The cuff 13 and the strap 14 and the buckle 15 form a second attachment. The second attachment is not limited to a cuff with a strap and a buckle, but may be any connector, coupling, fastener, link or tie used to secure the flexible duct to an inlet or outlet. The attachment may operate by various functions such as a compress, screw, lock, constrict, clench, pinch, shrink, squeeze, strangle, tighten, knot, loop, latch, magnetize, button, tuck, draw or secure such as with VELCRO®, a hook and loop fastener. Attachments will be described in various embodiments hereinafter.

Figure 3:
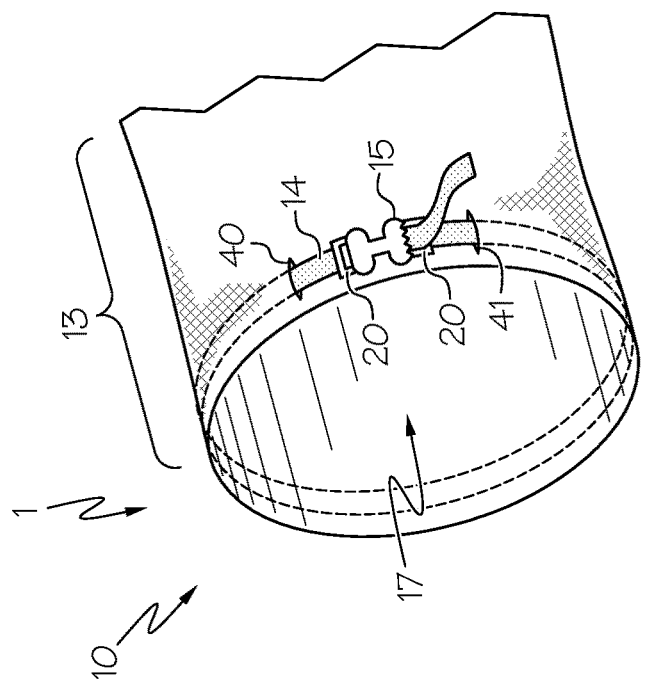
FIG. 3 depicts a close-up view of a cuff and buckle attachment at the end of the flexible portable ventilation duct.

Referring to FIG. 3, a close-up view of the cuff 13 and strap 14 is shown. The cuff 13 has two openings 40, 41. The openings 40, 41 may be holes, bores, slits, and the like. The strap 14 has two ends, each of which are shown strung through one of the openings 40, 41 such that the ends of the strap 14 are on the outside of the cuff 13. The portion of the strap 14 within the duct material 12 of the cuff 13 is shown extending around the circumference of the cuff 13 with dotted lines. Each end of the strap is attached to a buckle component 20. For example, one end of the strap 14 may be attached to a female buckle component and the other end of the strap 14 may be attached to a male buckle component, the male buckle component and female buckle component configured to releasably connect to form a buckle. The ends of the strap 14 are shown secured together by a buckle 15, which is formed when each buckle component 20 is connected together. The length of the strap 14 can be adjusted by pulling one end of the strap 14, or each end of the strap 14 further through the respective buckle components 20, thereby decreasing the circumference of the cuff 13. The ends of the strap 14 are not limited to being secured by a buckle 15. For example, the ends of the strap 14 could be secured by knot, loop, latch, hook, VELCRO®, magnets, button, fastener, and the like. As another example of the second attachment, one end of the strap 14 may have a permanent loop securing a clip to the strap 14, and the other end of the strap 14 may be inserted into the clip when the clip is opened. When the cuff 13 is placed over an air outlet, the non-looped end of the strap 14 may be pulled through the clip thereby decreasing the circumference of the cuff 13 and securing the cuff 13 tightly around the air outlet. As another example, cuff 13 may not have a strap or buckle, for example, cuff 13 may attach by an external quick-release clamp with screws, or a worm gear, a V-band quick-release clamp, zip ties, or screws. As another example, cuff 13 may be fitted with a pinlock collar riveted onto the ducting material 12. As a further example, the cuff 13 may have grommet and lace, wherein the lace is threaded through grommets located around the cuff and the ends of the lace or a loop of lace can be pulled tightly to secure the cuff 13. The cuff 13 may also be configured to be secured to an air outlet using a Keder Lock, also referred to as kador, ketter, sail rope, kidder, edge reinforcement, hem rope, keter, and welting. For example, the cuff 13 may have a strap that has a Keder core that slides into a channel, wherein when the Keder core is slid into the keder channel, it tightens the cuff around an air outlet. As another example, cuff 13 may be made of soft, flexible, malleable, adjustable, ductile, elastic formable, plastic, or stretchable material that can be stretched around a first inlet or a first outlet, or additional separate ducting. The cuff 13 may also be configured to secure around an air outlet by Velcro®. For example, the cuff 13 may have a Velcro® strap that can be secured tightly around the cuff 13 to secure the cuff to an air outlet.

Figure 4:
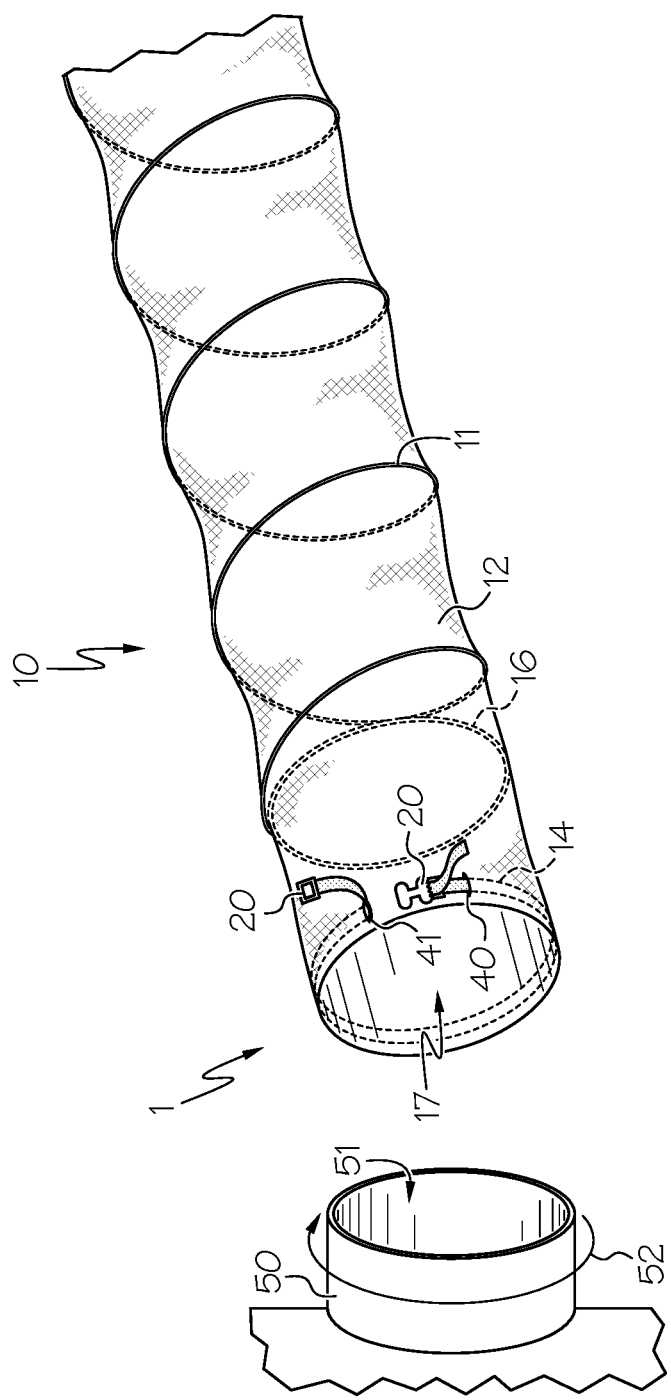
FIG. 4 depicts a perspective view of an end of the flexible portable ventilation duct with the cuff and buckle attachment positioned for usage, and an outlet of a heater.
Figure 5:
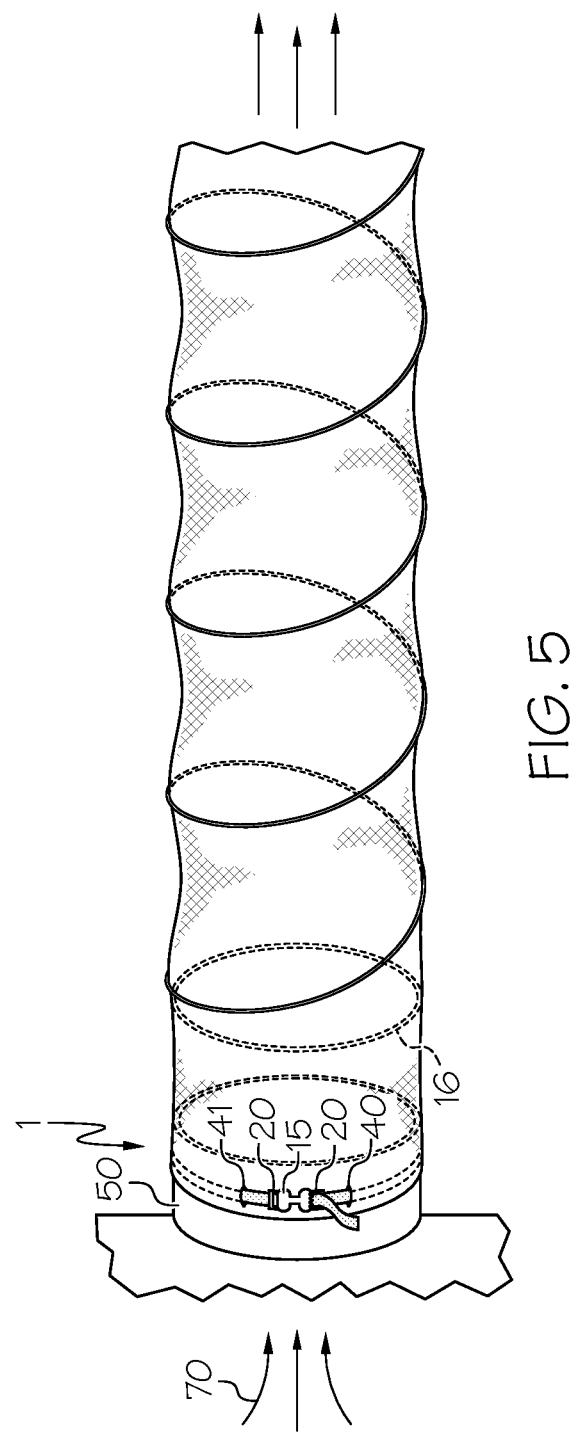
FIG. 5 depicts a perspective view of an end of a flexible portable ventilation duct attached to the air outlet by the cuff and buckle attachment.

Referring to FIG. 4, a heater 50 is shown having an outlet 51 from which heated air may be expelled from the heater 50. The outlet 51 has a circumference 52. Also shown is the flexible portable ventilation duct 10. The ends of the strap 14 are shown with buckle components 20 unbuckled. In this configuration, the cuff 13 can be placed and secured over the entire circumference 52 of the outlet 51. Referring now to FIG. 5, the flexible portable ventilation duct 10 is attached to the outlet 51 of the heater 50. To secure the flexible portable ventilation duct 10 to the outlet 51, the cuff 13 may be placed around the circumference 52 of the outlet 51, such that at least a portion of the outlet 51 is inside the portable flexible ventilation duct 10, and the buckle components 20 may be connected to form buckle 15. The ends of the strap 14 may then be pulled thereby tightening the strap 14 around the circumference 52 of the outlet 51. Heated air 70 exiting the outlet 51 of the heater 50 is thereby directed into the opening 17 of end 1 of flexible portable ventilation duct 10 and through the flexible portable ventilation duct 10.

Figure 6:
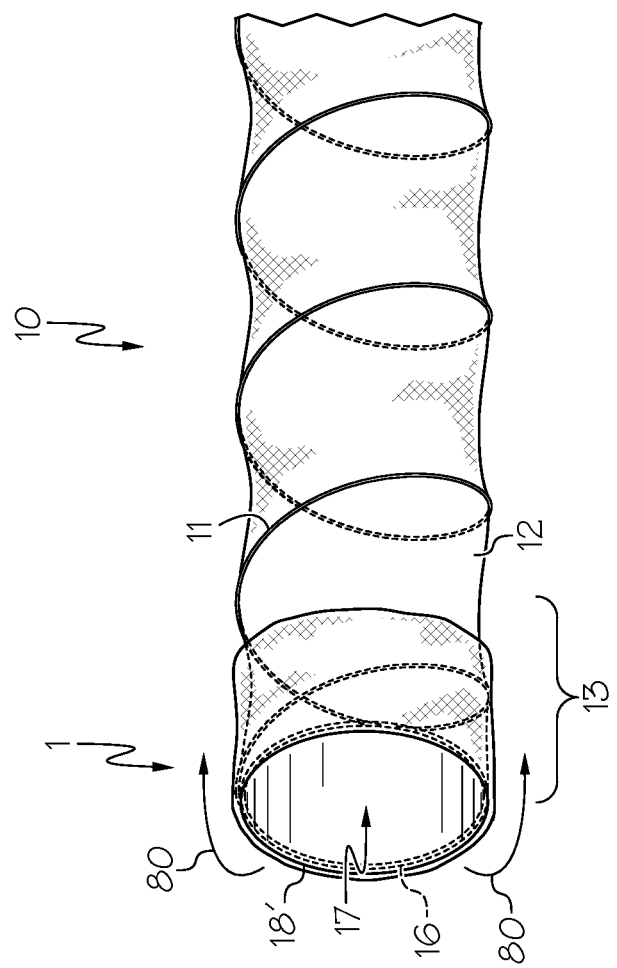
FIG. 6 depicts a perspective view of an end of a flexible portable ventilation duct with the cuff doubled back and a hoop attachment at an end of the flexible portable ventilation duct.

In some instances, an air outlet, such as outlet 51 of heater 50, may be configured such that a cuff 13 and buckle 15 attachment will not be suitable for attaching a flexible portable ventilation duct 10 to the outlet 51. For example, a hoop 16 attachment end may be required to attach the flexible portable ventilation duct 10 to the outlet 51. To address this requirement, a user may select the hoop 16 from the hoop 16 and the cuff 13 and buckle 15. A user may then switch from the cuff 13 and buckle 15 attachment to the hoop 16 attachment. To switch from the cuff 13 and buckle 15 attachment to use the hoop 16 to attach end 1 to the outlet 51, the buckle 15 can be unbuckled such that the ends of the strap 14 are no longer connected, as they are shown in FIG. 4. Referring to FIG. 6, the cuff 13 may be doubled back onto the flexible portable ventilation duct 10 in direction 80 away from the opening 17 such that the hoop 16 defines an edge 18' of the opening 17 at end 1. Double back or moving back may also be referred to as folding, curling, bending, overlapping or the like. Accordingly, the hoop 16 attachment and the cuff 13 and buckle 15 attachment may each be used independently of each other to connect the flexible portable ventilation duct 10 to a first inlet or a first outlet.

Figure 8:
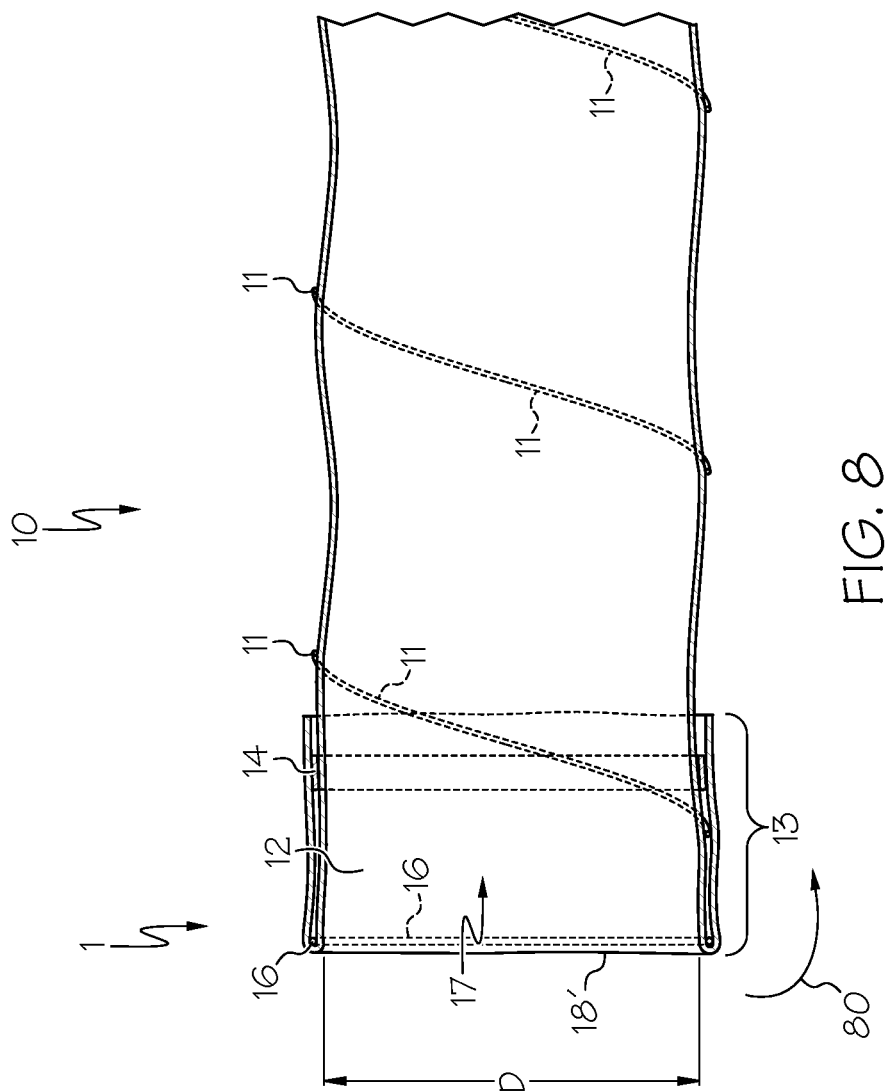
FIG. 8 depicts a side cut-away view of the flexible portable ventilation duct taken along line A-A, the flexible portable ventilation duct having been configured for use of the hoop attachment.
Figure 7:
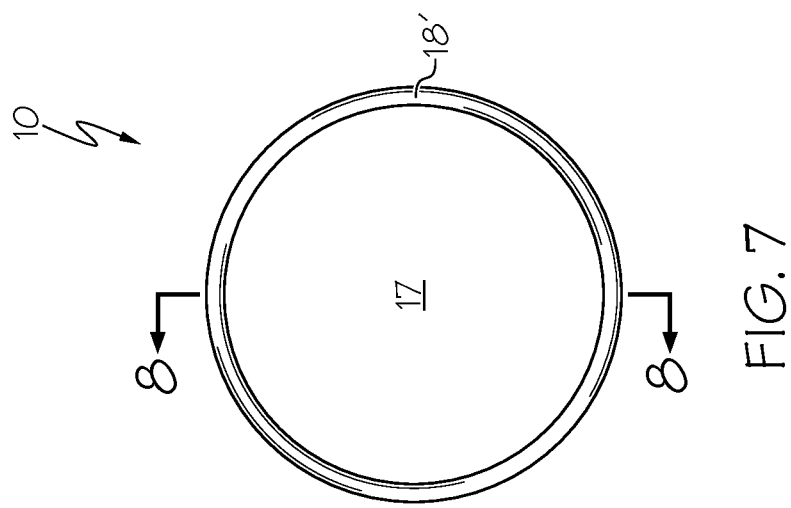
FIG. 7 depicts a front view of an end of a flexible portable ventilation duct.
Figure 11A:
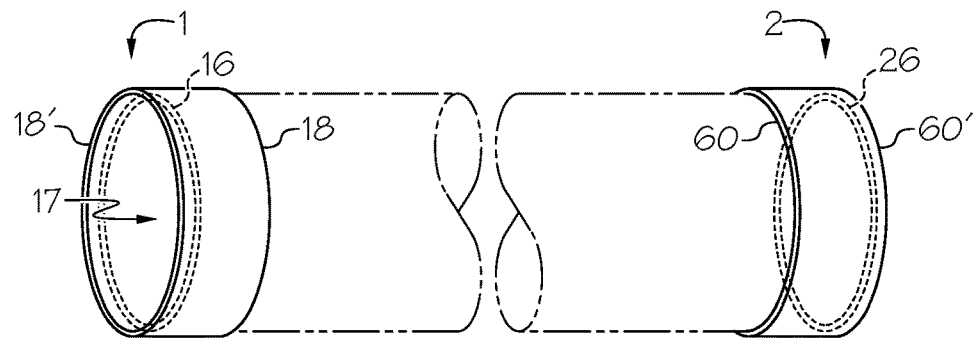
FIG. 11A depicts a perspective view of ends of a flexible portable ventilation duct according to one embodiment.
Figure 11B:
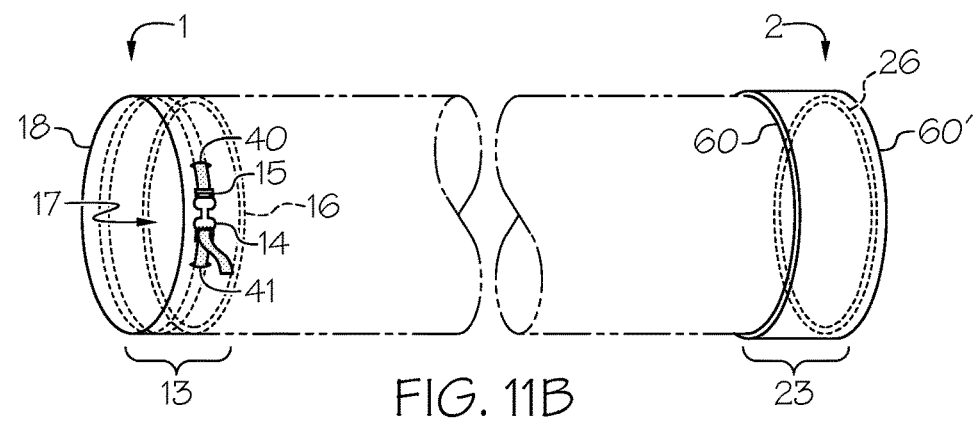
FIG. 11B depicts a perspective view of ends of a flexible portable ventilation duct according to one embodiment.
Figure 11C:
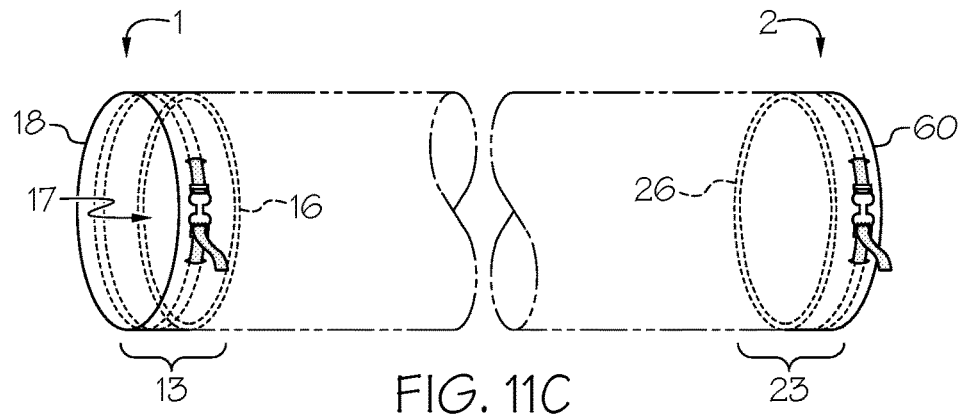
FIG. 11C depicts a perspective view of ends of a flexible portable ventilation duct according to one embodiment.
Figure 11D:
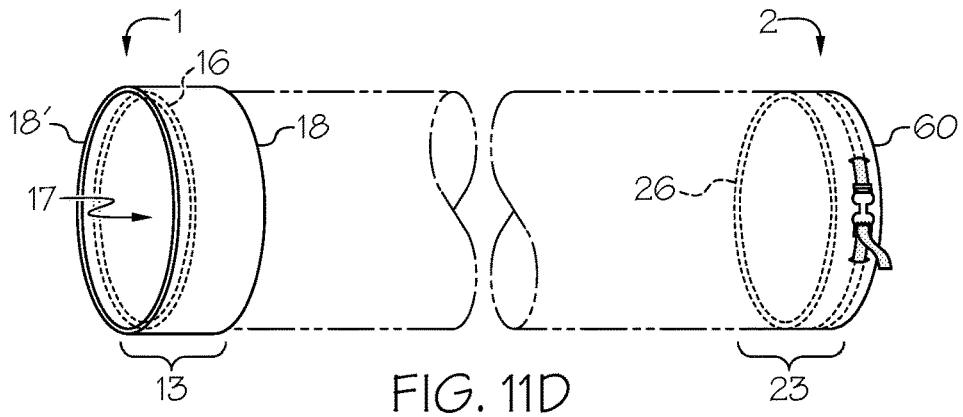
FIG. 11D depicts a perspective view of ends of a flexible portable ventilation duct according to one embodiment.

Referring to FIG. 7, the edge 18' of the flexible portable ventilation duct is shown in a front view. Taken along line A-A in FIG. 7, a cut-away view of the flexible portable ventilation duct 10 with the cuff 13 doubled-back is shown in FIG. 8. Referring to FIG. 8, the cuff 13 is shown doubled back in direction 80 onto the flexible portable ventilation duct 10. The strap 14 is thereby positioned between the doubled back cuff 13, and the flexible portable ventilation duct 10. Hoop 16, stitched within the duct material 12, thereby defines edge 18' of the flexible portable ventilation duct 10.

Referring to FIG. 9, the outlet 51 of the heater 50 having a circumference 52 is shown. The flexible portable ventilation duct 10 is also shown, the cuff 13 having been doubled-back as in, for example, FIGS. 6 and 8. Referring to FIG. 10, the flexible portable ventilation duct 10 is shown attached to the outlet 51, the hoop 16 having been pressed over the entire circumference 52 of the outlet 51 such that at least a portion of the outlet 51 is inside the portable flexible ventilation duct 10. The rigidity of the hoop 16 secures the flexible portable ventilation duct 10 to the outlet 51. Heated air 70 exiting the outlet 51 of the heater 50 is thereby directed into the opening 17 of and through the flexible portable ventilation duct 10.

It should be understood that end 1 and end 2 of flexible portable ventilation duct 10 are not limited to use in a heater application, and could be attached to any inlet, outlet, separate duct, and the like. A separate duct may be an air source, outlet, inlet, air destination, and the like.

Referring to FIG. 11, the end 2 of the flexible portable ventilation duct 10 may have the same configuration as end 1, including a cuff 23, strap 24, buckle 25, and hoop 26. End 1 and end 2 can be configured to attach in the same way, or in different ways. For example, when the flexible portable ventilation duct 10 is in use, end 1 and end 2 can both be configured to attach by cuff 13, 23 and buckle 15, 25, as shown in in FIG. 11C. Alternately, the cuff 13 at end 1, and the cuff 23 at end 2 can each be doubled back such that each of end 1 and end 2 are configured to attach by hoop 16 and hoop 26, respectively, as shown in FIG. 11A. As another example, as shown in FIGS. 11B and D, each of end 1 and end 2 can be configured to attach with a different attachment.

When end 1 and end 2 are each attached to, for example, a first inlet and a first outlet, respectively, or a separate duct, air can be transported through opening 17 from end 1 to end 2, or from end 2 to end 1, and into the desired air destination. Examples of inlets include an opening to a building, a wedding or event tent, or aircraft. Each of end 1 and end 2 can alternatively be attached to additional separate ducting. As an example, end 1, configured with the hoop 16 at the edge 18 of opening 17, may attach to a separate flexible portable ventilation duct end by placing the hoop 16 over an end of the separate flexible portable ventilation duct 10. This may be necessary or desirable when air must be transported a distance that cannot be spanned by a single flexible portable ventilation duct 10.

End 2 is not limited to having a cuff 23 and buckle 25 and hoop 26 configuration the same as end 1. For example, end 2 could have a machine end with no finishing that is attachable to, for example, a first inlet or a first outlet, or additional ducting, with an external worm clamp, zip ties, or screws. End 2 may be fitted with a pin lock collar riveted onto the ducting material 12. As another example, End 2 may be fitted with a soft cuff 23 of flexible material that can be stretched over the circumference of a first inlet or a first outlet, or additional ducting.

Referring to FIG. 12, a second embodiment of end 1 of the flexible portable ventilation duct 10 is shown. Cuff 13 has a zipper side 90 that corresponds with zipper side 91 on the edge 18' of the flexible portable ventilation duct 10. When the cuff 13 and buckle 15 attachment is in use, the cuff 13 can be attached to the flexible portable ventilation duct 10 by zipping zipper side 90 and zipper side 91 together, as shown in FIG. 13. When the hoop 16 attachment is in use, cuff 13 can be unzipped from the flexible portable ventilation duct 10, as shown in FIG. 12, and cuff 13 can be stored in a pocket 92 disposed on the flexible portable ventilation duct 10.

Figure 14:
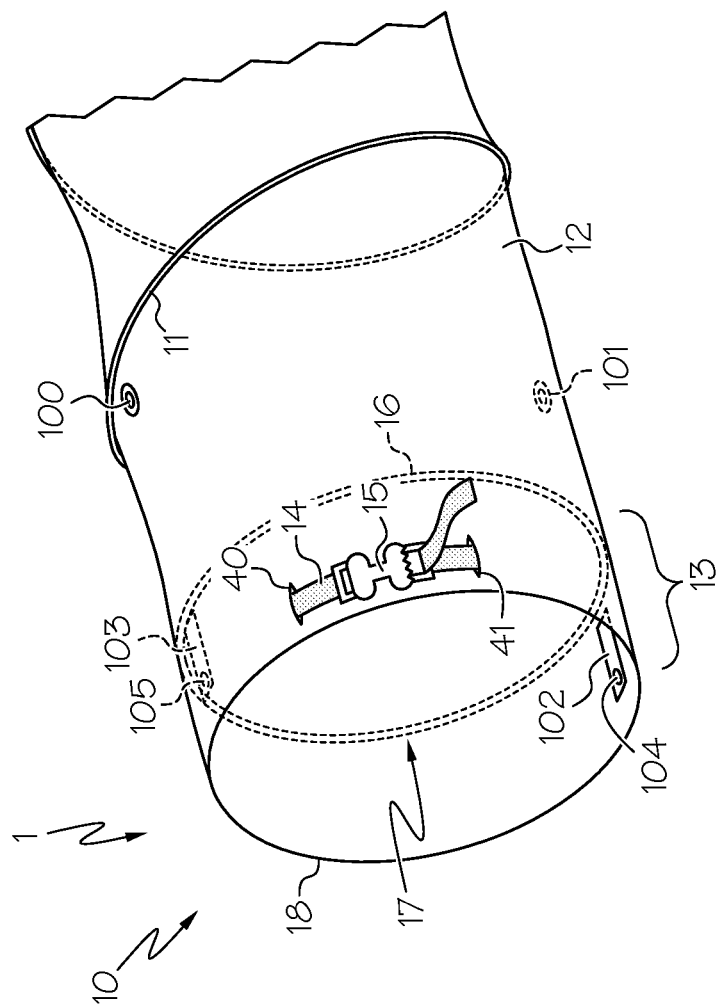
FIG. 14 depicts a perspective view of an embodiment of the flexible portable ventilation duct in which the cuff includes two snap button tabs.

Referring to FIG. 14, a third embodiment of end 1 of the flexible portable ventilation duct 10 is shown. Disposed opposite from one another on the inside of cuff 13 are a first tab 102 and a second tab 103. First tab 102 has a snap button male component 104 and second tab 103 has a snap button male component 105. Oriented in the same plane as the first and second tab 102, 103, and disposed on the flexible portable ventilation duct 10 are a snap button female component 100 which corresponds with snap button male component 105, and snap button female component 101 which corresponds with snap button male component 104. Referring now to FIG. 15, a front view of the opening 17 of the flexible portable ventilation duct 10 is shown. Also shown taken along line B-B is a cut-away side view of the flexible portable ventilation duct 10. When the hoop 16 attachment is in use, cuff 13 can be rolled backwards in direction 80 onto the flexible portable ventilation duct 10 such that the snap button male component 105 of tab 103 can be secured to the snap button female component 100, and the snap button male component 104 of tab 102 can be secured to the snap button female component 101. Hoop 16 is thereby positioned at edge 18' of the opening 17 and can be used to attach the flexible portable ventilation duct 10 to a first inlet or a first outlet, opening, and the like.

Referring to FIG. 16, a fourth embodiment is shown. Disposed around the inside circumference of the cuff 13 is a first circumferential projection 110, such as a flange or lip. The first circumferential projection 110 can be made of a rigid material such as metal, wood, plastic and the like, or a semi-rigid material such as plastic or rubber, or the like. Disposed around the outside of the flexible portable ventilation duct 10 is a second circumferential projection 111, such as a flange or a lip. The second circumferential projection 110 can be made of a rigid material such as metal, wood, plastic and the like, or a semi-rigid material such as plastic or rubber, or the like. Further disposed around the outside of the flexible portable ventilation duct 10 a distance 113 from the second circumferential projection 111 is a third circumferential projection 113. The third circumferential projection 113 can be made of a rigid material such as metal, wood, plastic and the like, or a semi-rigid material such as plastic or rubber, or the like. Referring to FIG. 17, the first circumferential projection 110 of the cuff 13 is disposed between the second circumferential projection 111 and the third circumferential projection 112, such that the cuff 13 is moveably secured to the flexible portable ventilation duct 10. When the cuff 13 and buckle 15 attachment is in use, the cuff 13 can be slid towards edge 18' until the first circumferential projection 110 is abutting the second circumferential projection 111. The second circumferential projection 111 is configured to prevent the first circumferential projection 110 of the cuff 13 from sliding off of the flexible portable ventilation duct 10. Referring to FIG. 18, when the hoop 16 attachment is in use, the cuff 13 may be pulled backwards in direction 80 such that the first circumferential projection 110 is abutting the third circumferential projection 112. The third circumferential projection 112 is configured to keep the first circumferential projection 110 of the cuff 13 positioned between the second circumferential projection 111 and the third circumferential projection 112 when the cuff 13 is not in use.

Figure 19:
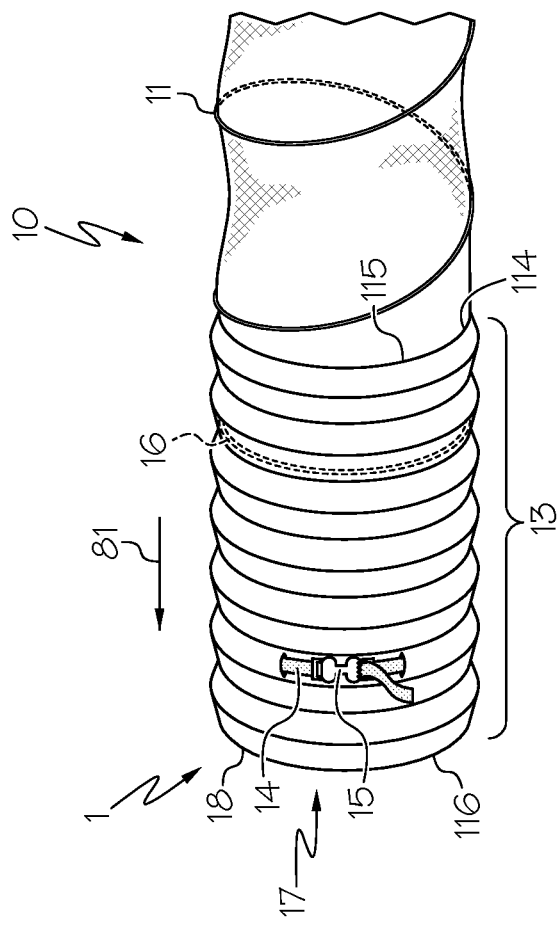
FIG. 19 depicts a perspective view of an embodiment of the flexible portable ventilation duct in which the cuff has a collapsible accordion shape.
Figure 20:
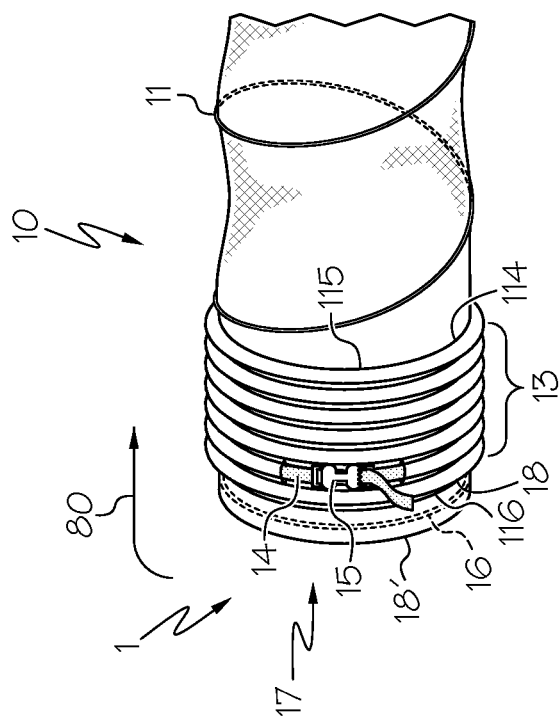
FIG. 20 depicts a perspective view of the cuff shown in FIG. 19 having been extended.

Referring to FIG. 19, a fifth embodiment is shown. Shown in FIG. 19, cuff 13 is configured with a collapsible accordion shape. Cuff 13 has a first circumferential cuff end 115 that is sewn around the flexible portable ventilation duct 10 by seam 114. Cuff 13 has a second circumferential cuff end 116 that, when the cuff 13 is in use, defines edge 18. When the hoop 16 attachment is in use, the second circumferential cuff end 116 of cuff 13 can be collapsed backwards in direction 80 such that the hoop 16 is positioned at edge 18'. Referring to FIG. 20, when the cuff 13 and buckle 15 attachment is in use, the first circumferential cuff end 116 can be extended in direction 81 past the hoop 16 such that the cuff 13 can be placed around a first inlet or a first outlet, or a separate duct. It should be understood that the flexible portable ventilation duct is not limited to having two attachments, and could have three or more attachments at either or both of the ends 1, 2.

Figure 21:
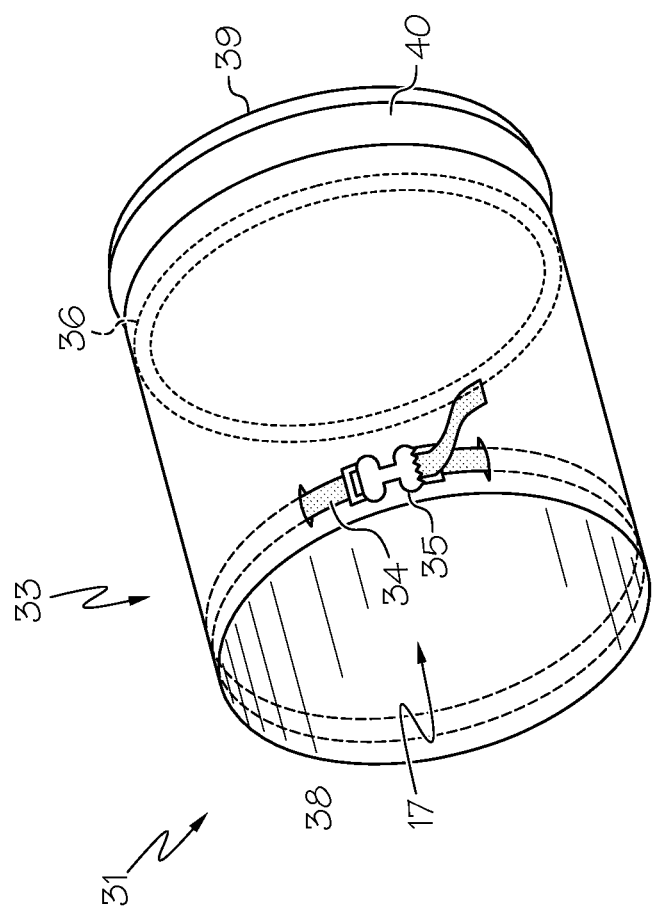
FIG. 21 depicts perspective view of a connector having two attachments.

Referring to FIG. 21, in another embodiment, a connector 31 includes a cuff 33, a hoop 36, a first end 38, and a second end 39. The connector 31 has an opening 37 that extends through the connector 31. The cuff 33 has a strap 34 and a buckle 35. The connector 31 has two attachments, a first attachment and a second attachment.

The first attachment is the cuff 33, and the strap 34 and the buckle 35. A user can select the first attachment to attach the connector 31 to a first inlet or a first outlet, and then so attach the connector 31 by placing the cuff 33 around a circumference of a first inlet or first outlet, and securing the strap 34 by buckling the buckle 35, thereby tightening the cuff 33 around the first inlet or first outlet. The second attachment is a hoop 36. A user can select the second attachment to attach the connector to a first inlet or a first outlet, and then so attach the connector by placing the hoop 36 around a circumference of the first inlet or first outlet. The first attachment and the second attachment are different. It should be understood that the first attachment is not limited to a cuff 33 and strap 14 and buckle 15, but could be any of the attachments hereinbefore described, for example, an elastic or stretchable cuff, or a cuff with a worm clamp. It should also be understood that the second attachment is not limited to a hoop 36, but can be any of the attachments hereinbefore described. The first attachment and the second attachment can be used independently of one another to connect the at least one end to a first inlet or a first outlet. The connector 31 is not limited to having two attachments, and could have more than two attachments.

Proximate to the second end 39, a ring of elastic 40 is disposed around the connector 31. The ring of elastic 40 can be used to stretch the second end 39 around the end of a duct to affix the connector 31 to the duct, thereby enabling the duct to be attached to a first inlet or a first outlet, or a separate duct, either by the first attachment, namely, the cuff 33 and buckle 35, or the second attachment, namely, the hoop 36 of the connector 31. The ring of elastic 40 can also be a third attachment. For example, the ring of elastic 40 could be stretched around a first inlet or a second inlet, and the first attachment or second attachment could be used to attach the connector 31 to an end of a duct. The connector 31 is not limited to being affixed to a duct by a ring of elastic 40, and could be affixed by Velcro®, hooks, magnets, adhesive, ties, and the like.

The cuff 33 can be doubled back to position the hoop 36 at the edge of the end of the duct to which the connector 31 is affixed. It should be understood that the connector 31 is not limited to having a hoop 36 and a cuff 33 and buckle 35. For example, the connector could have a hoop 36 and an elastic or stretchable cuff 33, or a cuff 33 that has an accordion configuration that allows it to move to position the hoop 16 for usage. Also, first and second attachments may be any of the attachments described in the hereinbefore embodiments of the invention. The connector can be made of duct material 12, or other flexible material.

In another embodiment, a method can be used to attach a flexible portable ventilation duct 10 to a first inlet or a first outlet. A user may provide a flexible portable ventilation duct 10 having ends 1, 2. The end 1 may have a first attachment (for example, a hoop 16 or other attachment hereinbefore described) and a second attachment (for example, a cuff 13 and strap 14 and buckle 15 or other attachment hereinbefore described). The end 1 may have more than two different attachments. The first attachment may be different than the second attachment. The end 2 may also have two different attachments, which may be the same as the first attachment or the second attachment of end 1, or different than the first attachment or the second attachment, or both of the first attachment and second attachment. Next, the user may select which attachment of the first attachment and second attachment the user is going to use to attach the flexible portable ventilation duct 10 to the first inlet or first outlet. Next, the user attaches the selected first attachment or second attachment to the first inlet or first outlet. The user may also attach end 2 to a first outlet or first inlet. The user can flow air through the portable flexible ventilation duct from a first outlet to a first inlet.

In another embodiment, a method can be used to attach a flexible portable ventilation duct 10 to a first inlet or a first outlet by using a connector 31. A user provides a flexible portable ventilation duct having ends 1, 2. The user provides a connector 31. The connector 31 may have a first attachment (for example, a hoop 16 or other attachment hereinbefore described) and a second attachment (for example, a cuff 13 and strap 14 and buckle 15 or other attachment hereinbefore described). The first attachment may be different than the second attachment. The user may then attach the connector 31 to the first end 1 of the flexible portable ventilation duct 10, for example, by using a ring of elastic 40 disposed around the connector 31 to place the connector around the first end 1 of the portable flexible ventilation duct 10. The connector 31 is not limited to being affixed to a duct by a ring of elastic 40, and could be affixed by Velcro®, hooks, magnets, adhesive, ties, and the like. The ring of elastic 40 can also be a third attachment. For example, the ring of elastic 40 could be stretched around a first inlet or a second inlet, and the first attachment or second attachment could be used to attach the connector 31 to the flexible portable ventilation duct 10.

The user may select which attachment of the first attachment and second attachment the user is going to use to attach the flexible portable ventilation duct 10 to the first inlet or first outlet. Next, the user may attach the selected first attachment or second attachment to the first inlet or first outlet. The user may also attach end 2 of the flexible portable ventilation duct 10 to a first inlet or a first outlet. End 2 may also have two different attachments, which may be the same as the first attachment or the second attachment of end 1, or different than the first attachment or the second attachment, or both of the first attachment and second attachment. The user can flow air through the portable flexible ventilation duct from a first outlet to a first inlet.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A flexible duct comprising:
   a hollow tube shape;
   at least one end;
   a first circumferential attachment integral to the at least one end;
   a second circumferential attachment integral to the at least one end,
   wherein the first circumferential attachment and the second circumferential attachment are different,
   wherein the at least one end has a first configuration in which the first circumferential attachment integral to the at least one end is positioned to independently mechanically couple the at least one end around a first inlet or a first outlet and a second configuration in which the second circumferential attachment integral to the at least one end is positioned to independently mechanically couple the at least one end around the first inlet or the first outlet, and wherein the first configuration and the second configuration are different.

2. The flexible duct of claim 1, wherein one of the first circumferential attachment or second circumferential attachment is removeable from the flexible duct.

3. The flexible duct of claim 2, wherein the one of the first circumferential attachment or second circumferential attachment includes a zipper that can be unzipped to disconnect the one of the first circumferential attachment or second circumferential attachment from the flexible duct.

4. The flexible duct of claim 1, including an end portion of the at least one end having an internally extending circumferential projection slidably fixed between a first outwardly extending circumferential projection on the flexible duct and a second outwardly extending circumferential projection on the flexible duct, wherein the internally extending circumferential projection is slidable to the first outwardly extending circumferential projection such that the first circumferential attachment is mechanically couplable around the first inlet or first outlet, wherein internally extending circumferential projection is slidable to the second outwardly extending circumferential projection such that the second circumferential attachment is mechanically couplable around the first inlet or first outlet.

5. The flexible duct of claim 1, wherein an end portion of the at least one end that includes the second circumferential attachment is configured to fold or roll backwards onto the flexible duct such that the first circumferential attachment is mechanically couplable around the first inlet or first outlet.

6. The flexible duct of claim 1, wherein at least one of the first circumferential attachment or second circumferential attachment includes a rigid hoop configured to be placed around and to compress around the first inlet or first outlet.

7. The flexible duct of claim 1, wherein at least one of the first circumferential attachment or second circumferential attachment includes a strap configured to tighten the at least one of the first circumferential attachment and second circumferential attachment around the first inlet or first outlet.

8. The flexible duct of claim 1, wherein an end portion of the at least one end includes a collapsible accordion structure including the first circumferential attachment, wherein the collapsible accordion structure is configured to extend such that the first circumferential attachment is mechanically couplable to the first inlet or second inlet, and wherein the collapsible accordion structure is configured to collapse such that the second circumferential attachment is mechanically couplable around the first inlet or first outlet.

9. The flexible duct of claim 1, wherein a second end of the flexible duct includes a third circumferential attachment integral to the second end and a fourth circumferential attachment integral to the second end, wherein the second circumferential attachment and the third circumferential attachment are each configured to independently mechanically couple the second end around the first inlet or a first outlet, and wherein the third circumferential attachment and the fourth circumferential attachment are different.

10. A method of using a flexible duct comprising:
providing a flexible duct including
a hollow tube shape;
at least one end;
a first circumferential attachment integral to the at least one end;
a second circumferential attachment integral to the at least one end,
wherein the first circumferential attachment and the second circumferential attachment are different,
wherein the at least one end has a first configuration in which the first circumferential attachment integral to the at least one end is positioned to independently mechanically couple the at least one end around a first inlet or a first outlet and a second configuration in which the second circumferential attachment integral to the at least one end is positioned to independently mechanically couple the at least one end around the first inlet or the first outlet, and
wherein the first configuration and the second configuration are different;
selecting one of the first circumferential attachment or the second circumferential attachment; and
mechanically coupling the selected first circumferential attachment or second circumferential attachment around the first inlet or first outlet.

11. A connector for a flexible duct comprising:
a hollow tube shape extending between a first connector end and a second connector end;
a first circumferential attachment integral to the first connector end;
a second circumferential attachment integral to the first connector end,
wherein the second connector end is configured to be affixed to a flexible duct end of the flexible duct such that an opening extends through the connector and flexible duct,
wherein the first circumferential attachment and the second circumferential attachment are different,
wherein the connector has a first configuration in which the first circumferential attachment integral to the first connector end is positioned to independently mechanically couple the first connector end around a first inlet or a first outlet and a second configuration in which the second circumferential attachment integral to the first connector end is positioned to independently mechanically couple the first connector end around the first inlet or the first outlet, and
wherein the first configuration and the second configuration are different.

12. The connector for the flexible duct of claim 11, wherein the connector is affixed to the flexible duct.

13. The connector for the flexible duct of claim 11, wherein the second connector end includes a rigid hoop configured to be placed around the flexible duct end to connect the connector to the flexible duct.

14. The connector for the flexible duct of claim 13, wherein the flexible duct end includes a second rigid hoop, wherein the rigid hoop of the second connector end of the connector is configured to be placed around the second rigid hoop to connect the connector to the flexible duct.

15. The connector for the flexible duct of claim 11, wherein the second connector end of the connector includes an elastic ring configured to stretch around the flexible duct end to connect the connector to the flexible duct.

16. A method comprising:
providing the connector for the flexible duct of claim 11;
affixing the second connector end to the flexible duct;
selecting one of the first circumferential attachment or the second circumferential attachment; and mechanically coupling the selected first circumferential attachment or second circumferential attachment around the first inlet or first outlet.

\* \* \* \* \*